June 11, 1968 — B. A. TERZIAN — 3,387,600
OVEN WITH AUTOMATIC AIR CURTAIN MEANS
Filed April 13, 1966 — 2 Sheets-Sheet 1

INVENTOR.
BERJ A. TERZIAN
BY
Eyre, Mann & Lucas
ATTORNEYS

June 11, 1968  B. A. TERZIAN  3,387,600

OVEN WITH AUTOMATIC AIR CURTAIN MEANS

Filed April 13, 1966  2 Sheets-Sheet 2

INVENTOR.
BERJ A. TERZIAN

BY
Eyre, Mann & Lucas
ATTORNEYS 3,387,600
OVEN WITH AUTOMATIC AIR CURTAIN MEANS
Berj A. Terzian, 3 Skerratt Lane,
Ossining, N.Y. 10562
Filed Apr. 13, 1966, Ser. No. 542,354
4 Claims. (Cl. 126—21)

ABSTRACT OF THE DISCLOSURE

A home appliance cooking oven is equipped with means for generating and sweeping an air curtain across its door opening when the oven door is opened, to prevent heat blast upon the person who desires access to the oven interior. After the air curtain has traversed the door opening, it is intercepted and deflected away from the oven interior directly back into the ambient air adjacent the front of the oven.

---

This invention relates to ovens and more particularly to ovens which are used to cook foods.

The modern oven with its thermostatic and timing controls is a versatile and efficient home appliance which makes oven-cooking a fairly simple and reliable method of preparation of foods. However, there remains one serious drawback in all such ovens and that is the uncontrolled escape of heat when the oven door is opened. Many oven-prepared foods should be frequently basted with pan juices or other flavor enhancing liquids, foods often require shifting from hotter to cooler parts of the oven, and sometimes foods have to be covered or uncovered in the oven as they cook. For these and other reasons, the oven door has to be opened frequently at which times a blast of heat surges upon the person seeking access to the oven interior. Confronted with the prospect of this unpleasant experience, the oven user may simply skip food tending steps to avoid the experience but this only sacrifices the quality of food preparation or, very commonly, he may contort his body to avoid the full thrust of the escaping heat and thereby receive a burn for lack of attention to the proximity of his hands or arms to hot surfaces of the oven. While the problem noted above is widespread and virtually a daily occurrence in homes, it has not been overcome to date by any practical solution.

The present invention provides a simple and effective remedy against uncontrolled escape of heat from ovens when the ovens are opened. This remedy comprises establishing across the door opening of the oven a barrier of ambient air or air having a cooler temperature than the oven temperature, this barrier taking the form of a sheet of flowing air which seals the door opening and prevents the heat of the oven from escaping through said opening. In this way, the oven user is completely protected from the heat of the oven and can open the oven door as often as he may desire without suffering the unnerving heat blast of conventional ovens. Furthermore, since the oven user can stand without discomfort immediately adjacent the oven opening, on the protected side of the flowing air sheet, there is no longer any need for body contortions or other distracting heat-escaping manuevers so that the likelihood of burns is considerably lessened. Also, the convenience of use of ovens made in accordance with the invention is greatly enhanced since it is no longer necessary to shut the oven door, immediately after food has been removed, to prevent further escape of heat as in conventional ovens. In fact, in the ovens of the invention, the oven door can be reinforced to serve as a work ledge upon which the oven user can conveniently baste foods or perform other food-tending operations while he is shielded against the oven heat by the protective sheet of flowing air sweeping across the door opening.

In practicing the invention, it is necessary to provide an oven with means for generating and directing a continuous sheet of flowing air across the door opening of the oven as well as means for supplying ambient air or air of cooler-than-oven temperature to said sheet generating means. The first requirement is accomplished by incorporating an air manifold along at least one side of the door opening of the oven and providing holes, slots, a continuous slit or other forms of discharge openings in the manifold aligned to face the opposite side of the door opening. When air is blown into this manifold, the air will exit from the discharge openings and flow in the form of a thin sheet or curtain across the door opening of the oven to the opposite side of the door opening, thereby providing a barrier against escape of heat through the door opening.

The second requirement of a supply of air to the air manifold is satisfied by connecting the air manifold to a hose, pipe or other conduit and equipping the conduit with a blower, fan or other blowing means for blowing air under pressure through the conduit into the air manifold and out through the discharge openings thereof. Preferably, a small radial drum blower is used as the blowing means since such a blower operates on a very efficient basis to provide a high velocity of flow of pressurized air with low noise. The blowing means, or an intake conduit or plenum chamber leading to such means, is preferably positioned somewhere below the oven since such an intake position will draw upon cooler air from the surrounding air, all other factors being equal, than if the intake position were located above the oven.

As previously mentioned, an air manifold is necessary along at least one side of the door opening in the ovens of the invention. This manifold may have any form of cross-section, for example, circular, triangular, rectangular or square. Preferably, the manifold is constructed as an integral part of the inner and outer walls of the oven so that it is unobtrusive and concealed, except for its discharge openings. The manifold may be located along one or the other of the vertical sides of the door opening whereby the sealing sheet of air will flow horizontally across the door opening. On the other hand, the manifold may also be located in a horizontal position along either the upper or lower horizontal sides of the door opening. With these arrangements, the sealing sheet of air will flow vertically across the door opening in a downward or upward direction respectively.

In a preferred embodiment of the invention, the side of the door opening opposite from the air manifold is provided with a knife-edged baffle positioned to intercept and change the direction of the oncoming sheet of flowing air. By such a baffle, all or a large portion of the air sheet can be directed to flow away from the interior of the oven as it reaches the baffle. In this way, the air sheet is prevented from entering the oven and disrupting its interior temperatures. As a matter of fact, oven temperature fluctuations are very much minimized in the ovens of the invention since the rapid escape of heat blasts as in conventional ovens is prevented to begin with and, furthermore, the sealing air sheet can be directed away from the oven interior as just described. The net result is that the rate of heat escape when the door of the improved oven is open is not substantially greater than when the door is closed, so that temperatures are uniformly maintained in the oven.

In another preferred embodiment of the invention, the discharge openings of the air manifold are so aligned that the sheet of air issuing therefrom will traverse the door opening in a plane located immediately adjacent the interior surface of the oven door. Furthermore, the motor drive for the air blower means is connected to a source of electricity through a microswitch which is actuated to the "on" position as soon as the oven door is moved slightly away from its closed position. In this way, the sealing air sheet can be generated immediately as the oven door is being opened, without impediment from the door, and oven heat cannot escape as the door gradually uncovers more of the area of the door opening. If desired, such automatic actuation can be substituted with an ordinary manually-operated on-off switch function whereby the oven user can generate and discontinue the sealing air sheet whenever he chooses. Combinations of such switching functions which will give the used a choice of superseding a normally automatic switching function can also be used.

As for the velocity or force of the air flow in the sealing sheet, it is not meaningful from a practical standpoint to specify values for this parameter since the effective velocity will vary considerably depending on many other parameters such as the size of the door opening, the size of the air manifold and of its discharge openings, the capacity of the pumping means, the temperature in the oven and the temperature of the air flowing in the sheet. Thus, the velocity of flow for establishing a sheet of flowing air which will prevent heat escape through the door opening will depend on each oven design that is specifically made utilizing the principles of the invention. However, for best results it is recommended that the effectiveness of heat sealing provided by the flowing air sheet be correlated to the maximum oven temperature that will be normally encountered to guarantee that heat will not be permitted to escape from the oven under any operating conditions. This can be readily determined by making simple tests with each particular oven design.

Further details of the invention will be readily understood by reference to the drawings which illustrate a preferred embodiment thereof and of which:

Figure 1:
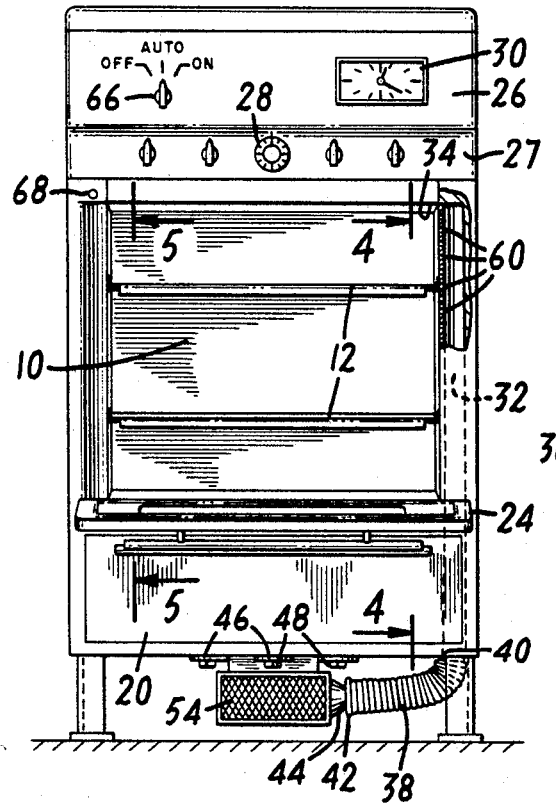
FIG. 1 is a front view of an oven made in accordance with the invention with the door thereof in open position.
Figure 2:
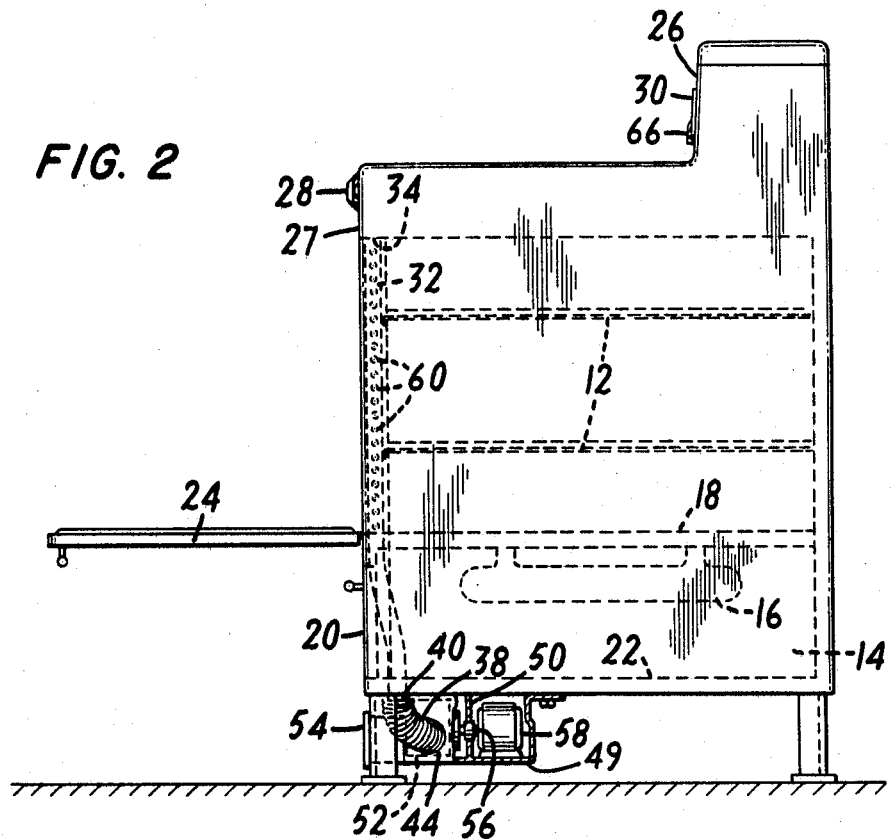
FIG. 2 is a side view of the oven of FIG. 1 with some parts broken away and in dashed lines for better illustration of detail.

Referring now to FIG. 1, an oven is there illustrated with the usual interior cooking chamber 10 and wire racks 12 for supporting roasting pans and similar food receptacles, as well as a surface or top cooking range the details of which are not shown. Below the main oven chamber 10, is a broiler section 14 (FIG. 2) with the usual overhead gas manifold 16 for maintaining jets of gas ignited substantiallly uniformly across the area of the oven floor 18 above. The front cover 20 and the floor 22 of the broiler section 14 may be slid outwardly to facilitate the placement and removal of pans of food which are to be broiled beneath the gas manifold 16. The oven is provided with a door 24 hinged along the bottom horizontal periphery of the door opening so that it may be raised and lowered to close and open the oven respectively. A front upper panel 27 of the oven supports the surface range gas valve controls as well as an oven gas valve control 28 which ignites the gas jets at the manifold 16 and controls the oven temperature in accordance with its setting. An electric clock 30 is supported upon the rear upper panel 26, and all of the foregoing parts constitute well known elements of conventional ovens.

In accordance with the invention, the inner and outer walls along one vertical side of the oven, adjacent the door opening, are constructed to form an elongated closed manifold 32 which extends from the top periphery 34 of the door opening down to the bottom outer wall 36 of the broiler section 14. The manifold 32 is thus an integral part of the walls of the oven but its interior space is isolated from the remaining elements of the oven.

At the bottom of the manifold 32, one end of a flexible hose 38 is attached in sealing relationship with a clamp 40 and the other end of the hose 38 is similarly clamped as at 42 to the discharge opening of a plenum chamber 44 contained within a housing 49 which is attached to the bottom wall 36 of broiler section 14 by means of flanges 46 and bolts 48. A wall 50 divides the housing 49 into a front section, containing plenum chamber 44, and a rear section. Within plenum chamber 44, a radial drum blower 52 is positioned with its intake opening facing a grille 54 which covers the front opening of plenum chamber 44. The closed rear end of blower 52 is attached to a drive rod 56 which passes through the dividing wall 50 and is coupled to the output shaft of an electric motor 58 attached to the floor of the rear section of the housing 49. The drive rod 56 is supported in conventional manner in the wall 50 to permit free rotation thereof while maintaining a substantially gas tight seal at the support opening. Thus, the rear section of the housing 49 is completely isolated from the front section, and the walls of the plenum chamber 44, within the front section, are positioned in close proximity to the outer surfaces of the blower 52 except in the area of the discharge opening to which the hose 38 is clamped.

Figure 3:
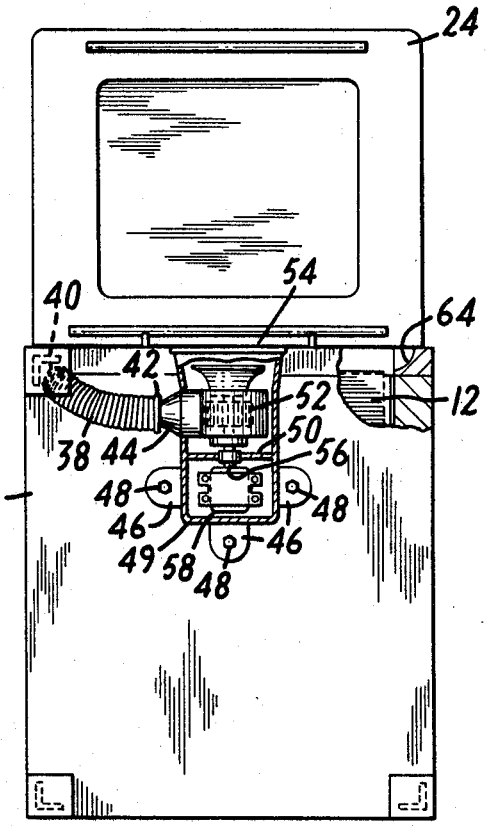
FIG. 3 is a bottom view of the oven of FIG. 1 with parts broken away, and with the blower-to-manifold air flow path and the air interceptor-baffle being reversed in position relative to FIG. 1.
Figure 4:
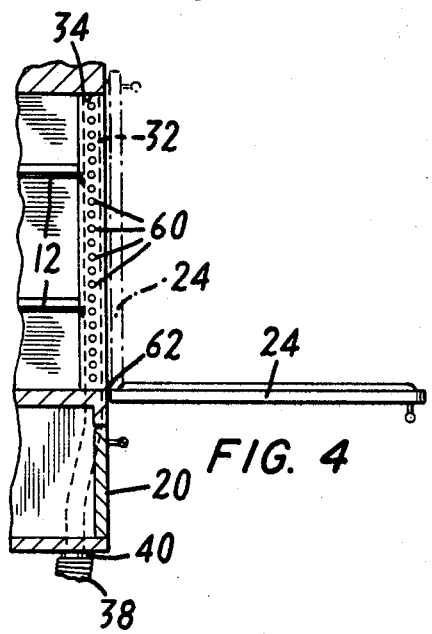
FIG. 4 is a sectional view taken along line 4—4 of FIG. 1.
Figure 5:
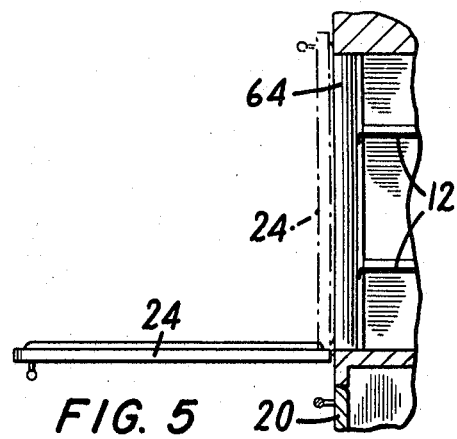
FIG. 5 is a sectional view taken along line 5—5 of FIG. 1.

Referring now to FIG. 4, the interior wall of the manifold 32, facing across the door opening to the opposite side of the oven, is provided with a row of discharge openings 60 extending from the top periphery 34 down to the bottom periphery 62 of the door opening. At the opposite side of the oven (FIGS. 3 and 5), a knife-edged curved baffle 64 extends similarly from the top periphery down to the bottom periphery of the door opening and the vertical knife edge of the baffle is aligned with the discharge openings 60 of the manifold 32. As shown in FIG. 5, the baffle 64 is curved in a direction leading out towards the door 24 so that any air flow intercepted by the knife edge of the baffle will be diverted away from the interior of the oven. Also, as shown by the dashed lines in FIGS. 4 and 5, when the door 24 is closed, the position of the discharge openings 60 and the knife-edged baffle 64 is such that a continuous plane extends between the openings and baffle just behind the closed door which does not block or interrupt said plane in any way.

Referring to FIG. 1, the upper rear panel 26 is provided with a conventional 3-position dial switch 66 having its positions marked "Off," "Auto" and "On." Also, a conventional microswitch 68 having a spring loaded switch arm is positioned in the left front wall of the oven against which the door 24 comes into contact in its closed position. Thus, the oven door 24 will push the arm of the microswitch 68 inwardly during the time it is closed, but as soon as the door is moved slightly away, the spring-loaded arm will move outwardly to actuate the switch.

Figure 6:
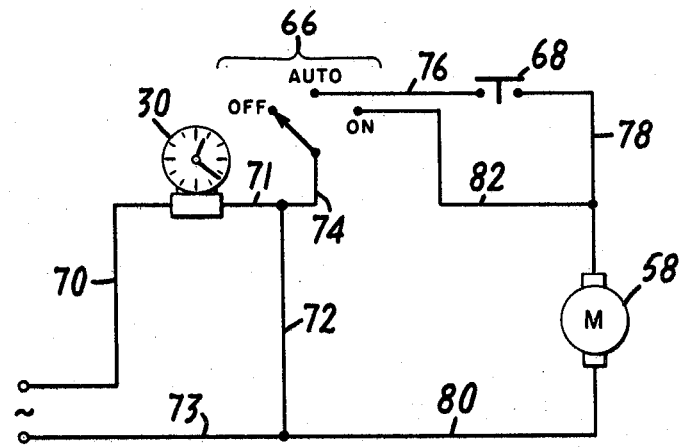
FIG. 6 is a wiring diagram for an electrical circuit used in association with the oven of the preceding figures.

Referring to FIG. 6 of the drawings, a 120 v. 60 cycle source is connected through line 70 to the electric clock 30 and the circuit is completed through lines 71, 72 and 73 to maintain the clock 30 in continuous operation. Line 74 is connected to dial switch 66 which in its "Off" position maintains an open circuit to prevent current flow to the motor 58. In its "Auto" position, switch 66 connects line 74 to microswitch 68 through line 76, and the other side of microswitch 68 is connected through line 78 to motor 58 which in turn is connected through line 80 to line 73 to provide a path for current flow back to the source thereof. In its "On" position, dial switch 66 provides an alternate path for current flow through line 82 to motor 58 from whence a circuit is completed in like manner to the circuit of the "Auto" position.

In normal operation of the oven which has now been described above, dial switch 66 is moved to the "Auto" position. During the time that oven door 24 is closed, the arm of microswitch 68 remains retracted behind the pressure of the door and no current can flow to motor 58 (FIG. 6). When the door is slightly opened, the microswitch 68 closes and motor 58 is energized whereby the drum blower 52 begins rotating. The blower 52 sucks in relatively cool ambient air through the grille 54 and this air is pumped through the flexible hose 38 up into the manifold 32. The air exits from the discharge openings 60 and flows in the form of a thin sheet (such configuration being imparted by the alignment and shape of the openings) across the entire door opening and over to the knife edge baffle 64 where the major proportion of the air is intercepted and deflected outwardly away from the oven interior.

The thin sheet of flowing air across the door opening establishes a seal or barrier against escape of heat from the oven interior out towards the person who is opening the door, and since the flowing air is substantially prevented from entering the interior of the oven, the oven temperature is not substantially disrupted. Thus, by the time the door 24 has been moved to its fully open position, the heat of the oven is effectively contained and cannot cause harm or discomfort to the person standing before the door opening. Should it be desired to generate the sealing sheet of flowing air prior to even a slight opening of the oven door 24, dial switch 66 is moved to the "On" position and an energizing circuit is thereby established for the motor 58 is illustrated in FIG. 6. Likewise, should it be desired to open the door 24 without establishing the sealing sheet of flowing air, dial switch 66 is moved to the "Off" position to deactivate the motor 58.

The invention has now been described in terms of its operating principles and a specific embodiment thereof. Obviously, changes can be made in the foregoing description without departing from the essence of the invention. For example, while ambient air has been mentioned as making up the sealing sheet, other nontoxic or inert gases can be used in place of air with equal effectiveness in prevention of heat escape. Also, while a combination floor-supported gas range and oven is illustrated in the drawings, the invention obviously can be applied to wall-mounted ovens or any other home appliance form of oven.

Accordingly, it will be understood that it is intended to cover all changes and modifications of the preferred embodiments of the invention, herein chosen for the purpose of illustration, which do not constitute departures from the spirit and scope of the invention.

I claim:
1. In a home appliance form of oven having a door and a door opening associated therewith, the improvement comprising means for generating a sheet of flowing gas and directing said sheet along a path which traverses said door opening, means for blowing gas into said generating means with sufficient force to establish said sheet as an effective barrier against substantial escape of heat from the oven interior when said door is opened, means for intercepting said sheet and deflecting a substantial proportion of the gas flow thereof away from the oven interior directly into the ambient air adjacent said door opening after said path has been traversed, first switch means which is automatically operated upon each opening and closing of said door, electric circuit means including said first switch means for electrically energizing and de-energizing said blowing means in response respectively to each opening and closing of said door, and said electric circuit means including second switch means for energizing and de-energizing said blowing means at any time independently of the position of said door.

2. The improvement as in claim 1 wherein said sheet is composed of ambient air having a temperature below that in the oven interior.

3. The improvement as in claim 1 wherein said intercepting means includes an edge which is aligned in and coextensive with said sheet and further includes a deflecting surface which curves from said edge in a direction away from said oven interior, whereby the gas flow of said sheet is intercepted directly by said edge and diverted immediately thereafter by said curved deflecting surface into the ambient air adjacent said door opening.

4. The improvement as in claim 1 wherein said generating means and said intercepting means are located behind the closed door of said oven so that said sheet may be generated and intercepted while said door is closed.

References Cited

UNITED STATES PATENTS

| | | | |
|---|---|---|---|
| 2,167,047 | 7/1939 | Jackson et al. | 110—179 X |
| 2,558,997 | 7/1951 | Voelker | 98—36 X |
| 2,862,369 | 12/1958 | Simons | 98—36 X |
| 3,032,028 | 5/1962 | Pearce et al. | 126—21 |
| 3,038,400 | 6/1962 | Ruff | 98—36 |
| 3,131,687 | 5/1964 | Kalla | 98—36 X |
| 3,172,349 | 3/1965 | Courtier | 98—36 |

ROBERT A. O'LEARY, *Primary Examiner.*

M. A. ANTONAKAS, *Assistant Examiner.*